(12) United States Patent
Takayanagi (10) Patent No.: US 10,920,110 B2
(45) Date of Patent: Feb. 16, 2021

(54) TAPE FOR PRODUCING NON-QUILTED ARTICLES AND GARMENT USING THE TAPE

(71) Applicant: Toray Industries, Inc., Tokyo (JP)

(72) Inventor: Hajime Takayanagi, Osaka (JP)

(73) Assignee: Toray Industries, Inc., Tokyo (JP)

( * ) Notice: Subject to any disclaimer, the term of this patent is extended or adjusted under 35 U.S.C. 154(b) by 65 days.

(21) Appl. No.: 16/465,855

(22) PCT Filed: Nov. 15, 2017

(86) PCT No.: PCT/JP2017/041070
§ 371 (c)(1),
(2) Date: May 31, 2019

(87) PCT Pub. No.: WO2018/101040
PCT Pub. Date: Jun. 7, 2018

(65) Prior Publication Data
US 2019/0297974 A1    Oct. 3, 2019

(30) Foreign Application Priority Data

Dec. 2, 2016   (JP) .............................. JP2016-235335

(51) Int. Cl.
| | | |
|---|---|---|
| *A41D 27/24* | (2006.01) | |
| *B29C 65/48* | (2006.01) | |
| *B29C 65/50* | (2006.01) | |
| *C09J 7/21* | (2018.01) | |
| *D03D 11/00* | (2006.01) | |

(Continued)

(52) U.S. Cl.
CPC ................ *C09J 7/21* (2018.01); *A41D 27/00* (2013.01); *A41D 27/245* (2013.01); *A41D 31/00* (2013.01); *A41D 31/04* (2019.02); *B29C 65/4815* (2013.01); *B29C 65/5021* (2013.01); *B29C 65/5028* (2013.01); *B29C 65/5057* (2013.01); *C09J 201/00* (2013.01); *D03D 1/00* (2013.01); *D03D 11/00* (2013.01); *A41D 31/065* (2019.02);

(Continued)

(58) Field of Classification Search
CPC ......... C09J 7/21; C09J 201/00; A41D 27/245; A41D 27/00; A41D 31/00; A41D 31/04; A41D 31/065; A41D 2500/20; B29C 65/4815; B29C 65/5021; B29C 65/5028; B29C 65/5057; D03D 1/00; D03D 11/00; A47G 9/02; Y10T 442/3472–3699; Y10T 428/28–2896
USPC ...... 442/203–220, 239–267; 428/343–355 N
See application file for complete search history.

(56) References Cited

U.S. PATENT DOCUMENTS

| | | | |
|---|---|---|---|
| 4,868,012 A | 9/1989 | Demoulin | |
| 6,800,159 B2 * | 10/2004 | Itoh ........................ | A41D 27/06 112/413 |

(Continued)

FOREIGN PATENT DOCUMENTS

| | | |
|---|---|---|
| CN | 1951163 A | 4/2007 |
| CN | 203048858 U | 7/2013 |

(Continued)

Primary Examiner — Jeremy R Pierce
(74) Attorney, Agent, or Firm — DLA Piper LLP (US)

(57) ABSTRACT

A low-cost smooth-surfaced tape is used to produce a non-quilted article. An adhesive portion is provided on the outer surface on one side of the tape, and another adhesive portion is provided on the outer surface on the reverse side of the tape. Adhesive portion-free surfaces are arranged to face each other.

4 Claims, 4 Drawing Sheets

(51) Int. Cl.
  *C09J 201/00* (2006.01)
  *A41D 27/00* (2006.01)
  *D03D 1/00* (2006.01)
  *A41D 31/00* (2019.01)
  *A41D 31/04* (2019.01)
  *A41D 31/06* (2019.01)
  *A47G 9/02* (2006.01)

(52) U.S. Cl.
  CPC ...... *A41D 2300/52* (2013.01); *A41D 2500/20* (2013.01); *A47G 9/02* (2013.01)

(56) References Cited

U.S. PATENT DOCUMENTS

| | | | | |
|---|---|---|---|---|
| 8,221,863 B2* | 7/2012 | Keener | ............ | C09J 7/21 |
| | | | | 428/40.1 |
| 9,080,264 B2* | 7/2015 | Bertolani | ............ | D03D 11/02 |
| 2004/0171318 A1* | 9/2004 | Rashed | ............ | D03D 11/00 |
| | | | | 442/33 |
| 2005/0061386 A1* | 3/2005 | Lam | ............ | D03D 1/00 |
| | | | | 139/93 |
| 2006/0063455 A1* | 3/2006 | Murphy | ............ | C09J 7/21 |
| | | | | 442/327 |
| 2018/0207613 A1 | 7/2018 | Böhringer et al. | | |

FOREIGN PATENT DOCUMENTS

| | | |
|---|---|---|
| EP | 3297823 B1 | 1/2019 |
| JP | 63-275786 A | 11/1988 |
| JP | 5-186948 A | 7/1993 |
| JP | 11-124550 A | 5/1999 |
| JP | 2000-204326 A | 7/2000 |
| JP | 2002-338908 A | 11/2002 |
| JP | 3114116 U | 8/2005 |
| JP | 2008-69488 A | 3/2008 |
| JP | 2009-279192 A | 12/2009 |
| JP | 2011-89064 A | 5/2011 |
| JP | 3190860 U | 5/2014 |
| WO | 2006/112558 A2 | 10/2006 |
| WO | 2014/156557 A1 | 10/2014 |

* cited by examiner

TAPE FOR PRODUCING NON-QUILTED ARTICLES AND GARMENT USING THE TAPE

TECHNICAL FIELD

This disclosure relates to a tape for producing a non-quilted article and a garment using the tape.

BACKGROUND

Quilting stitches are sewn in various types of garments such as down jackets, down vests, and skiwear filled with synthetic fibers to prevent the filling (such as down) from shifting. However, quilting inevitably produces seams on the garment fabric, and warm air retained in the garment escapes through the seams. Another drawback is that the filling such as down and synthetic fibers comes out of the seams. Yet another drawback is that rainwater may easily enter through the needle holes on the quilted fabric.

To solve these problems, various types of products have been manufactured by bonding textile fabrics together without stitching with a sewing machine, and such products have become commercially available. One known example of such a bonded textile product is one produced by interposing a heat bonding tape or a similar material having an adhesive made of a resin such as a urethane resin, an acrylic resin and a silicone resin, between fabrics stacked on top of another, and applying pressure and heat to the heat bonding tape to melt the adhesive and then harden the adhesive to bond the fabrics together (JP 2002-338908 A).

However, adhesive bonding has a drawback that the fabric easily comes off or peels off from the adhesive when the bonded part is pulled or the garment is repeatedly washed. Adhesive bonded garments are not as strong as those produced by sewing machine stitching. To overcome this drawback, a technique to increase the bonding strength of an adhesive bonded part has been proposed in which tiny fibrils are raised on a textile surface or, in other words, a textile surface is made uneven to induce an anchoring effect between the uneven surface and an adhesive (JP H05-186948 A and JP S63-275786 A). However, the technique in which tiny fibrils are raised on a textile surface to induce an anchoring effect between the textile surface and an adhesive as described in JP H05-186948 A and JP S63-275786 A requires an abrasion and/or scratching step to raise tiny fibrils on the textile surface and has low productivity, and the tiny fibrils may easily form a pill or a snag.

The bonded textile products as disclosed in JP 2002-338908 A, JP H05-186948 A and JP S63-275786 A are not satisfactory in terms of bonding strength. In view of this, WO 2014/156557 discloses a bonded textile product comprising at least two fabrics stacked on top of another each made of at least a textile woven or knitted fabric or a nonwoven fabric, and the textile product further comprising an adhesive portion containing an adhesive interposed between the fabrics, wherein the at least two fabrics each have a bulkiness of 1.0 to 5.0 cm$^3$/g, and the textile woven or knitted fabric or the nonwoven fabric is at least partially made of a splitting fiber, a finished yarn or a composite fiber.

Figure 11:
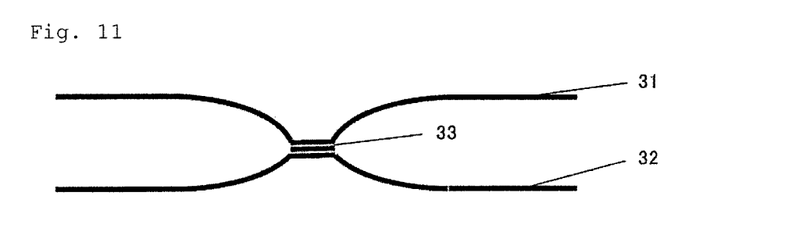
FIG. 11 is a sectional view of the conventional bonded structure.

In the bonded structure of the bonded textile product as disclosed in WO 2014/156557 (also called the conventional bonded structure), a face fabric 31 and a lining fabric 32 are bonded together with a double-sided melt tape 33 as shown in FIG. 11. The conventional bonded structure of FIG. 11, however, has a disadvantage in that, when a force that pulls the face fabric 31 upward and another force that pulls the lining fabric 32 downward are simultaneously applied to the product, the bonded part may be easily separated. In addition, the fabrics are tightened around the part bonded with the double-sided melt tape 33 and, as a result, the amount of the filling that can be interposed between the face fabric 31 and the lining fabric 32 is small and, consequently, thermal insulation properties of the bonded textile product used as cold weather clothing are poor.

Figure 12:
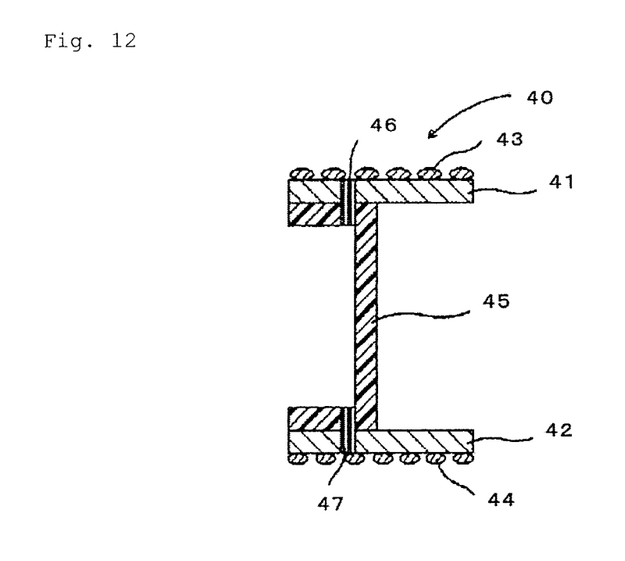
FIG. 12 is a sectional view of the conventional tape for producing a non-quilted article.

JP 2009-279192 A discloses a tape 40 for producing a non-quilted article (also called the conventional tape for producing a non-quilted article) designed to solve the problem of down leakage from quilting seams. As shown in FIG. 12, the tape for producing a non-quilted article disclosed in JP 2009-279192 A contains textile attachment elements 41, 42 having adhesive portions 43, 44 arranged in a dotted manner. A textile partition 45 is placed between the textile attachment elements 41, 42, and the textile partition 45 and the textile attachment elements 41, 42 are joined together by sewing at joins 46, 47. This technique requires the extra step of creating the joins 46, 47, which step adds an additional cost. In addition, due to the joins 46, 47, the tape also has a drawback of not being smooth at the joins.

It could therefore be helpful to provide a low-cost smooth-surfaced tape for producing a non-quilted article, and a highly thermally insulating garment to which the tape is firmly bonded via an adhesive portion that has high peel resistance.

SUMMARY

I thus provide:

(1) A tape for producing a non-quilted article, the tape comprising adhesive portions on outer surfaces on one side and on the reverse side of the tape, the tape being a cut piece of a double-layer woven fabric comprising a fabric layer arranged on one side of the fabric and a fabric layer arranged on the reverse side of the fabric, the tape comprising adhesive portion-free surfaces arranged to face each other.

(2) A tape for producing a non-quilted article, the tape comprising adhesive portions on outer surfaces on one side and on the reverse side of the tape, the tape being a cut piece of a triple-layer woven fabric comprising a fabric layer arranged on one side of the fabric, a fabric layer arranged on the reverse side of the fabric, and an intermediate layer arranged between the fabric layers on the one side and on the reverse side of the fabric, the tape comprising adhesive portion-free surfaces arranged to face each other.

(3) A garment comprising a face fabric bonded to an adhesive portion on an outer surface on one side of the tape for producing a non-quilted article according to the above (1), a lining fabric bonded to an adhesive portion on an outer surface on the reverse side of the tape for producing a non-quilted article according to the above (1), and a filling packed between the face fabric and the lining fabric.

(4) A garment comprising a face fabric bonded to an adhesive portion on an outer surface on one side of the tape for producing a non-quilted article according to the above (2), a lining fabric bonded to an adhesive portion on an outer surface on the reverse side of the tape for producing a non-quilted article according to the above (2), and a filling packed between the face fabric and the lining fabric.

The tape for producing a non-quilted article is a cut piece obtained by cutting a double- or triple-layer woven fabric in the direction parallel to the binding points that connect the fabric layers, and adhesive portions are provided on the outer surfaces on one side and the reverse side of the tape. In this manner, the tape is produced at a low cost and has a smooth surface. The garment has no seams and, therefore, the garment prevents the filling from coming out of the garment and also prevents warm air trapped therein from escaping to the outside, and thus achieves excellent cold protective properties. The face fabric and the lining fabric are not directly joined by the adhesive portions but are joined via the binding points and, therefore, the adhesive portions bonded to the face fabric and the lining fabric do not peel off easily.

REFERENCE SIGNS LIST

1 Warp yarns
2 Weft yarns
3 Fabric layer on one side of the fabric
4 Fabric layer on the reverse side of the fabric
5 Weft yarns
6 Warp yarns
7 Fabric layer on one side of the fabric
8 Fabric layer on the reverse side of the fabric
9 Intermediate fabric layer
11a Fabric layer on one side of the tape
11b Fabric layer on the reverse side of the tape
12a Adhesive portion
12b Adhesive portion
13a Fabric layer on one side of the tape
13b Fabric layer on the reverse side of the tape
14a Adhesive portion
14b Adhesive portion
15 Face fabric
16 Lining fabric
17a, 17b Fabrics
18 Face fabric
19 Lining fabric
20a, 20b Fabrics
21 Down jacket
22 Joins

DETAILED DESCRIPTION

Weave for Producing Fabric Layers on One Side and the Reverse Side of the Garment The weave for producing the fabric layers on one side and the reverse side of my garment includes, for example, plain weave in which "each weft thread passes alternately over and under a warp thread and each warp thread passes alternately over and under a weft thread", twill weave in which "each weft thread does not pass alternately over and under a warp thread or vice versa, but each weft thread passes over one warp thread and then passes under two warp threads (1×2 twill), or each weft thread passes over one warp thread and then passes under three warp threads (1×3 twill)", satin weave in which "there are a small number of floats of weft threads and only warp threads appear to lie on the surface and therefore the fabric has a glossy surface", solidly covered weave that "uses colored threads to weave a background design on another type of weave, such as a plain or satin weave", high density weave that "is the most suitable for and capable of reproducing fine detail that ordinary weave cannot produce such as an intricate artwork or small texts, due to use of a special type of yarn or a high yarn density", shrink resistant weave that "resists shrinkage and distortion", and crepe weave that "produces a rough, dull surface like the skin of a pear" and the like. Of these, preferred is plain weave, which has more interlaced threads as compared with other types of weave and is therefore strong although thin as a fabric.

Filling Packed Between the Face Fabric and the Lining Fabric of the Garment

The filling packed between the face fabric and the lining fabric of my garment may be, for example, down, feather, cotton, polyester and the like. Preferred are staple fibers of polyester such as polyethylene terephthalate, with a single fiber fineness of 0.1 to 5.0 dtex. Such polyester staple fibers have excellent heat retaining properties. The weight per area of the filling is preferably 50 to 500 g/m$^2$ for excellent heat retaining properties.

Structural Fibers of the Face Fabric and the Lining Fabric of the Garment

The face fabric and the lining fabric of my garment can be produced by weaving multifilament yarns. Multifilament yarns are composed of a plurality of monofilaments. To provide a certain amount of strength to the fabrics to be produced, the fineness of the multifilament yarns is preferably 3 dtex or more, more preferably 5 dtex or more, further more preferably 7 dtex or more. Preferably, the fineness of the multifilament yarns is 25 dtex or less, more preferably 16 dtex or less, further more preferably 12 dtex or less. The multifilament yarns with a fineness in the above range can be used to produce a lightweight thin fabric with a predetermined strength.

The strength at break of the multifilament yarns is preferably 3.5 cN/dtex or more, more preferably 4.5 cN/dtex or more, and is preferably 10 cN/dtex or less, more preferably 6 cN/dtex or less. The multifilament yarns with strength at break in the above range can be used to produce a fabric with adequate tear strength, even when the multifilament yarns contain filaments having a highly flat shape.

The elongation at break of the multifilament yarns is preferably 35% or more and is preferably 50% or less. If a certain force is applied to the face fabric or lining fabric made of multifilament yarns having an elongation at break of less than 35%, the stress corresponding to the force may concentrate on a single monofilament and, as a result, the fabric may be easily torn. On the other hand, if the elongation at break is more than 50%, the spun yarns are elongated under strong tension due to friction between the yarns and various spinning devices, and the yarns may be easy to break.

The monofilaments in the multifilament yarns will be specifically described below.

The fineness of the monofilaments is preferably 0.5 dtex or more, more preferably 1.0 dtex or more, and is preferably 3.0 dtex or less, more preferably 2.5 dtex or less. The monofilaments with a fineness in the above range can be used to produce a fabric having appropriate tear strength and low air permeability.

The multifilament yarns and the monofilaments may be made of any type of synthetic fibers such as nylon fibers and polyester fibers. To achieve high strength and dimensional stability, preferred are polyester fibers. Examples of the polyester fibers include polyethylene terephthalate fibers, polybutylene terephthalate fibers and the like. The polyester fibers may be copolymerized polyester fibers produced by copolymerizing polyethylene terephthalate or polybutylene terephthalate with an acid component, for example, isophthalic acid, sodium 5-sulfoisophthalate, or an aliphatic dicarboxylic acid such as adipic acid. The fibers contained in the multifilament yarns may be a single type or an appropriate combination of different types of fibers.

To produce the multi-layer woven fabric containing a plurality of compartments by weaving the fabric layers on one side and the reverse side of the multi-layer woven fabric, the weaving can be done with the so-called hollow weave that can produce a hollow woven fabric in which fabric layers are joined at the selvage ends. The size of the area of the individual compartments should be suitable to accommodate an appropriate volume of the filling packed between the face fabric and the lining fabric so that a soft feel is achieved. Hence, the area is preferably 1 inch$^2$ or more. The loom that can be used to produce the hollow woven fabric is, for example, an air-jet loom, a water-jet loom, a rapier loom or the like. The shedding device that can be used is, for example, a Dobby shedding device, a jacquard shedding device or the like.

Figure 1:
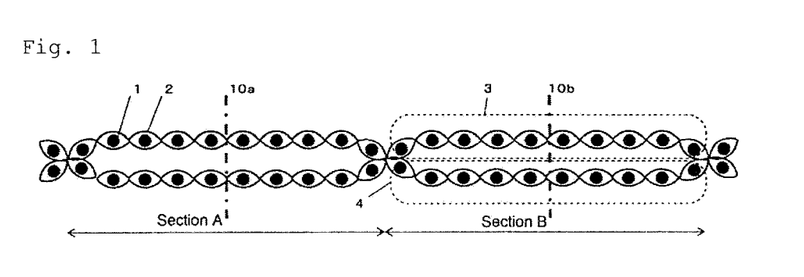
FIG. 1 shows a sectional view of an example of a double-layer woven fabric.
Figure 2:
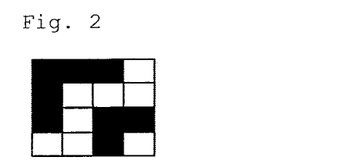
FIG. 2 is a weave diagram of the section A of the fabric of FIG. 1.
Figure 3:
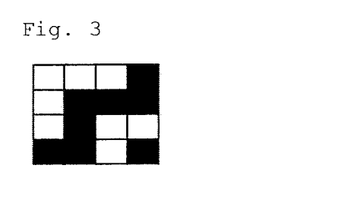
FIG. 3 is a weave diagram of the section B of the fabric of FIG. 1.
Figure 4:
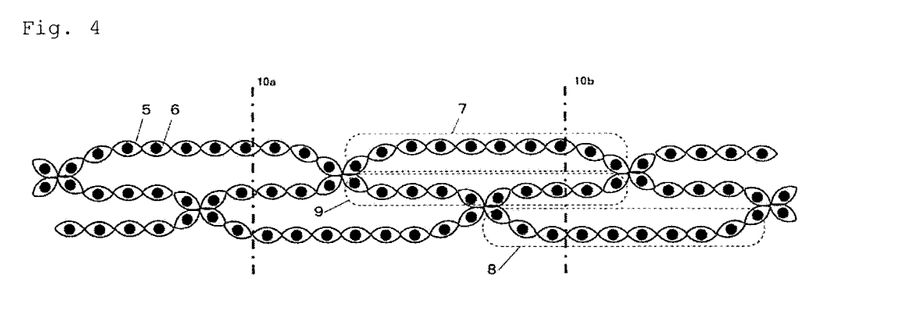
FIG. 4 shows a sectional view of an example of a triple-layer woven fabric.
Figure 5:
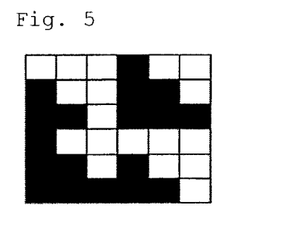
FIG. 5 is a weave diagram of the fabric of FIG. 4.

FIG. 1 shows a sectional view of an example of a double-layer woven fabric. FIG. 2 is a weave diagram of the section A of the fabric of FIG. 1. FIG. 3 is a weave diagram of the section B of the fabric of FIG. 1. FIG. 1 contains warp yarns 1, weft yarns 2, a fabric layer 3 on one side of the double-layer woven fabric, and a fabric layer 4 on the reverse side of the double-layer woven fabric. FIG. 4 shows a sectional view of an example of a triple-layer woven fabric. FIG. 5 is a weave diagram of the fabric of FIG. 4. FIG. 4 contains weft yarns 5, warp yarns 6, a fabric layer 7 on one side of the triple-layer woven fabric, a fabric layer 8 on the reverse side of the triple-layer woven fabric, and an intermediate fabric layer 9.

Figure 6:
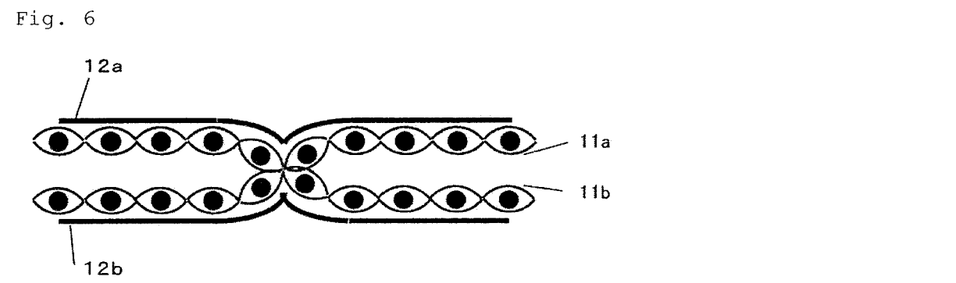
FIG. 6 shows a sectional view of an example of my tape for producing a non-quilted article. The tape is a cut piece of a double-layer woven fabric comprising a fabric layer arranged on one side of the fabric and a fabric layer arranged on the reverse side of the fabric. The tape is obtained by cutting the double-layer woven fabric in the direction parallel to the binding points of the fabric layers, avoiding cutting directly on the binding points. Adhesive portions are provided on the outer surfaces on one side and the reverse side of the tape, and adhesive portion-free surfaces are arranged to face each other.

FIG. 6 shows a sectional view of an example of my tape for producing a non-quilted article. The tape is a cut piece of a double-layer woven fabric comprising a fabric layer arranged on one side of the fabric and a fabric layer arranged on the reverse side of the fabric. The tape is obtained by cutting the double-layer woven fabric in the direction parallel to the binding points of the fabric layers, avoiding cutting directly on the binding points (i.e., by cutting the double-layer woven fabric vertically in the plane of the figure, along the dot-dashed lines 10*a* and 10*b* as shown in FIG. 1). Adhesive portions are provided on the outer surfaces on one side and the reverse side of the tape, and adhesive portion-free surfaces are arranged to face each other. As shown in FIG. 6, an adhesive portion-free fabric layer 11*a* is arranged to face another adhesive portion-free fabric layer 11*b*. An adhesive portion 12*a* is provided on the outer surface on one side of the tape, and another adhesive portion 12*b* is provided on the outer surface on the reverse side of the tape.

Figure 7:
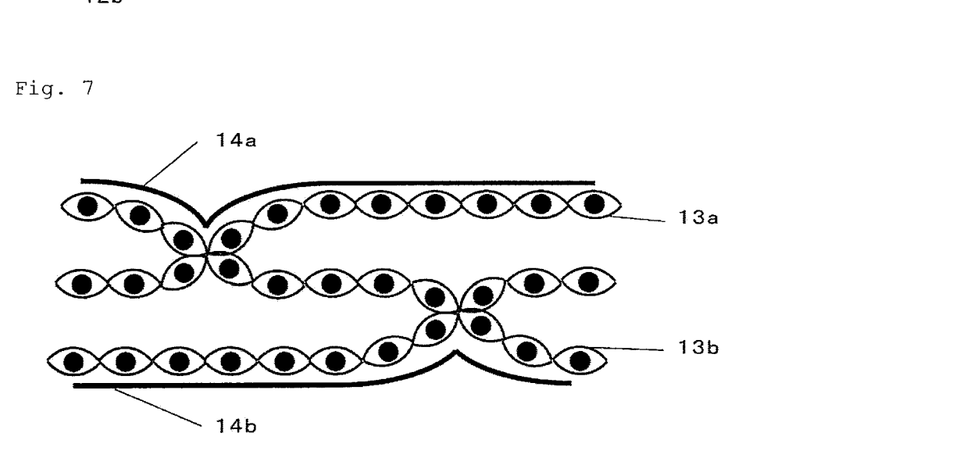
FIG. 7 shows a sectional view of an example of my tape for producing a non-quilted article. The tape is a cut piece of a triple-layer woven fabric comprising a fabric layer arranged on one side of the fabric, a fabric layer arranged on the reverse side of the fabric, and an intermediate layer arranged between the fabric layers on the one side and on the reverse side of the fabric. The tape is obtained by cutting the triple-layer woven fabric in the direction parallel to the binding points of the fabric layers, avoiding cutting directly on the binding points. Adhesive portions are provided on the outer surfaces on one side and the reverse side of the tape, and adhesive portion-free surfaces are arranged to face each other.

FIG. 7 shows a sectional view of an example of my tape for producing a non-quilted article. The tape is a cut piece of a triple-layer woven fabric comprising a fabric layer arranged on one side of the fabric, a fabric layer arranged on the reverse side of the fabric, and an intermediate layer arranged between the fabric layers on the one side and on the reverse side of the fabric. The tape is obtained by cutting the triple-layer woven fabric in the direction parallel to the binding points of the fabric layers, avoiding cutting directly on the binding points (i.e., by cutting the triple-layer woven fabric vertically in the plane of the figure, along the dot-dashed lines 10*a* and 10*b* as shown in FIG. 4). Adhesive portions are provided on the outer surfaces on one side and the reverse side of the tape. As shown in FIG. 7, an adhesive portion-free fabric layer 13*a* is arranged to face another adhesive portion-free fabric layer 13*b*. An adhesive portion 14*a* is provided on the outer surface on one side of the tape, and another adhesive portion 14*b* is provided on the outer surface on the reverse side of the tape.

Figure 8:
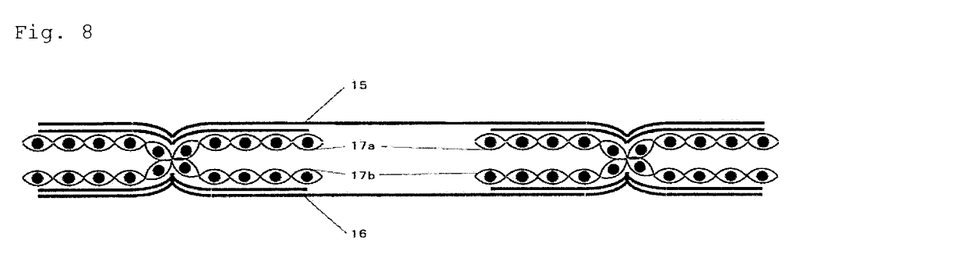
FIG. 8 is a sectional view of an example of my garment produced using the tape for producing a non-quilted article as shown in FIG. 6.

FIG. 8 is a sectional view of an example of my garment produced using the tape for producing a non-quilted article as shown in FIG. 6. As shown in FIG. 8, a face fabric 15 is bonded to an adhesive portion on the outer surface on one side of the tape, and a lining fabric 16 is bonded to an adhesive portion on the outer surface on the reverse side of the tape. A filling as exemplified above (para [0014] of WO 2018/101040) can be packed into the space surrounded by the face fabric 15, the lining fabric 16, a fabric 17*a* and a fabric 17*b*.

Figure 9:
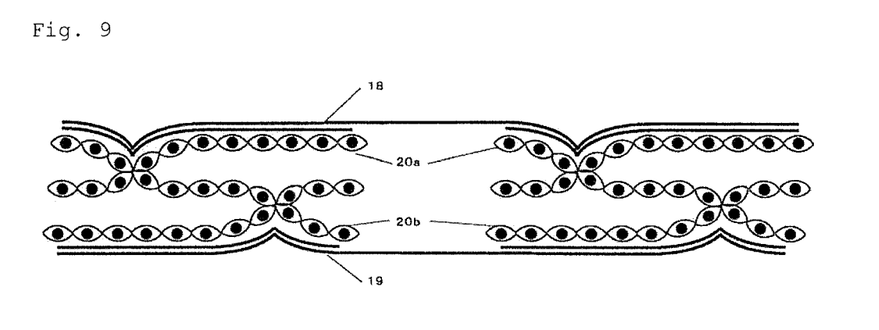
FIG. 9 is a sectional view of an example of my garment produced using the tape for producing a non-quilted article as shown in FIG. 7.

FIG. 9 is a sectional view of an example of my garment produced using the tape for producing a non-quilted article as shown in FIG. 7. As shown in FIG. 9, a face fabric 18 is bonded to an adhesive portion on the outer surface on one side of the tape, and a lining fabric 19 is bonded to an adhesive portion on the outer surface on the reverse side of the tape. A filling as exemplified above (para [0014] of WO 2018/101040) can be packed into the space surrounded by the face fabric 18, the lining fabric 19, a fabric 20*a* and a fabric 20*b*.

Type of Adhesive

The adhesive used to form the adhesive portions is typically an organic adhesive. Organic adhesives are broadly classified into natural resin adhesives such as natural rubber and casein; semi-synthetic adhesives such as cellulose acetate; and synthetic resin adhesives such as polyurethane- and acrylic-based adhesives. Preferred are synthetic resin adhesives that are easy to process and available at a low cost. Synthetic resin adhesives are further classified into thermosetting adhesives such as polyurethane- and polyester-based adhesives; thermoplastic adhesives such as PVA-, vinyl chloride-, acrylic resin- and polyethylene-based adhesives; elastomer adhesives such as silicone rubber- and nitrile rubber-based adhesives; and composite adhesives such as nylon-epoxy adhesives and vinyl-phenolic adhesives. Preferred are thermosetting adhesives that have flexibility and high adhesive strength. Thermosetting adhesives are further classified into dry curing types such as aqueous type, emulsion type and latex type; chemical reaction types cured by crosslinking reaction occurring upon mixing of a base resin and a curing agent; heat melting types that are in a solid form at normal temperature but melt by heating and harden by cooling; and pressure-sensitive types that are in the form of a high-viscosity fluid and form a bond when pressure is applied. Preferred are heat melting type thermosetting adhesives, which form a strong bond at a fabric-adhesive interface. Resins suitable as a component of heat melting type thermosetting adhesives include an ethylene-vinyl acetate copolymer, a polyamide resin, a polyester resin, a polyurethane resin, a polyolefin resin and the like. Preferred is a polyurethane resin, which is easy to process.

Bonding Process

Suitable adhesive bonding process is typically heat pressing process, high-frequency heating process, or ultrasonic bonding process, and any of these may be used. Preferred is heat pressing process, which is performed at a low cost and has high productivity.

EXAMPLES

My tapes and garments will be described in more detail with reference to Examples, but are not limited thereto. Various modifications and alterations are possible without departing from the technical scope of the disclosure.

Example 1

A double-layer woven fabric of plain weave was woven from two sets of warp yarns (22 dtex) and two sets of weft yarns (22 dtex) with a water-jet loom. The warp and weft yarns were a nylon FDY of 20 D/24 f and were arranged at a warp density of 400 ends/2.54 cm and a weft density of 400 picks/2.54 cm. An adhesive was applied to the surface of the fabric layer 11a on one side of the fabric and to the surface of the fabric layer 11b on the reverse side of the fabric as shown in FIG. 6 to form adhesive portions 12a and 12b. The fabric was then cut in the direction vertical in the plane of the figure, along the dot-dashed lines 10a and 10b as shown in FIG. 1. In this manner, a tape with double-layer woven fabric structure for producing a non-quilted article as shown in FIG. 6 was produced.

Separately, a woven fabric was produced from warp yarns (22 dtex) and weft yarns (22 dtex) with a water-jet loom. The warp and weft yarns were a nylon FDY of 20 D/24 f and were arranged at a warp density of 200 ends/2.54 cm and a weft density of 200 picks/2.54 cm. The produced woven fabric was used as a face fabric and a lining fabric to produce a down jacket 21 as shown in FIG. 10.

Figure 10:
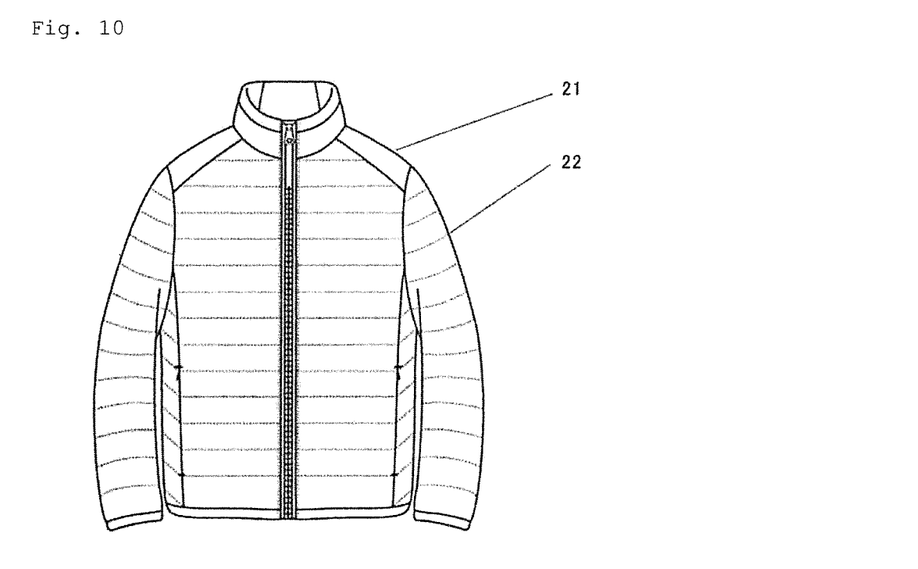
FIG. 10 is a front view of a down jacket produced in Examples and Comparative Example.

In FIG. 10, the numeral 22 represents the joins between the face fabric and the lining fabric. The face fabric was joined with the lining fabric by bonding the face fabric to the adhesive portion 12a on the outer surface on one side of the tape with double-layer woven fabric structure for producing a non-quilted article, and then bonding the lining fabric to the adhesive portion 12b on the outer surface on the reverse side of the tape. The down jacket was then packed with 50 g of down per fabric area in $m^2$. The down jacket was treated with water repellent finish using a fluorine-based water repellent. The down jackets produced in Example 2 and Comparative Example 1 described later were also packed with the same amount of down and treated with water repellent finish using the same fluorine-based water repellent. The peel strength of the joins 22 of the produced down jacket 21 and the do value of the product including the joins 22 are shown in Table 1. The peel strength (N) as shown in Table 1 was measured in accordance with JIS L 1093, A-1 method (2011). The tensile speed was 30 cm/min and the width of the specimen was 10 cm. The do value was measured in accordance with ASTM D 1518-85. The measurement was performed at the center of the back of the jacket at 20° C. at a relative humidity of 65%.

Example 2

A triple-layer woven fabric of plain weave was woven from three sets of warp yarns (22 dtex) and three sets of weft yarns (22 dtex) with a water-jet loom. The warp and weft yarns were a nylon FDY of 20 D/24 f and were arranged at a warp density of 600 ends/2.54 cm and a weft density of 600 picks/2.54 cm. An adhesive was applied to the surface of the fabric layer 13a on one side of the fabric and to the surface of the fabric layer 13b on the reverse side of the fabric as shown in FIG. 7 to form adhesive portions 14a and 14b. The fabric was then cut in the direction vertical in the plane of the figure, along the dot-dashed lines 10a and 10b as shown in FIG. 4. In this manner, a tape with triple-layer woven fabric structure for producing a non-quilted article as shown in FIG. 7 was produced.

Separately, a woven fabric was produced from warp yarns (22 dtex) and weft yarns (22 dtex) with a water-jet loom. The warp and weft yarns were a nylon FDY of 20 D/24 f and were arranged at a warp density of 200 ends/2.54 cm and a weft density of 200 picks/2.54 cm. The produced woven fabric was used as a face fabric and a lining fabric to produce a down jacket 21 as shown in FIG. 10. The face fabric and the lining fabric were joined in the same manner as in Example 1 except that the tape with triple-layer woven fabric structure for producing a non-quilted article was used instead of the tape with double-layer woven fabric structure for producing a non-quilted article. The peel strength of the joins 22 of the produced down jacket 21 and the do value of the product including the joins 22 are shown in Table 1.

Comparative Example 1

Another down jacket 21 as shown in FIG. 10 was produced in the same manner as in Example 1 except that the joins 22 were formed by a different method. The face fabric and the lining fabric were directly bonded with a double-sided melt tape as shown in FIG. 11 to form the joins 22. The peel strength of the joins 22 of the produced down jacket 21 and the do value of the product including the joins 22 are shown in Table 1.

TABLE 1

| | Peel strength (N) | Clo value |
|---|---|---|
| Example 1 | 50 | 1.5 |
| Example 2 | 50 | 1.8 |
| Comparative Example 1 | 5 | 1.3 |

As shown in Table 1, the garments of Examples 1 and 2 have higher peel strength and a higher do value than those of Comparative Example 1. The garment of Example 2 has a higher do value than that of Example 1.

INDUSTRIAL APPLICABILITY

My garment is suitable as outerwear such as cold weather clothing, and as bedclothes. Specifically, the garment can be used as down wear, down jackets, down coats, down vests, lap robes, futons, sleeping bags and the like.

The invention claimed is:

1. A tape for producing a non-quilted article, the tape comprising adhesive portions on outer surfaces on one side and a reverse side of the tape, the tape being a cut piece of a double-layer woven fabric comprising a fabric layer arranged on one side of the fabric and a fabric layer arranged on a reverse side of the fabric, the tape comprising adhesive portion-free surfaces arranged to face each other.

2. A tape for producing a non-quilted article, the tape comprising adhesive portions on outer surfaces on one side and a reverse side of the tape, the tape being a cut piece of a triple-layer woven fabric comprising a fabric layer arranged on one side of the fabric, a fabric layer arranged on a reverse side of the fabric, and an intermediate layer arranged between the fabric layers on said one side and on said reverse side of the fabric, the tape comprising adhesive portion-free surfaces arranged to face each other.

3. A garment comprising a face fabric bonded to an adhesive portion on an outer surface on one side of the tape according to claim 1, a lining fabric bonded to an adhesive portion on an outer surface on the reverse side of the tape, and a filling packed between the face fabric and the lining fabric.

4. A garment comprising a face fabric bonded to an adhesive portion on an outer surface on one side of the tape according to claim 2, a lining fabric bonded to an adhesive portion on an outer surface on the reverse side of the tape, and a filling packed between the face fabric and the lining fabric.

* * * * *